Oct. 22, 1935.   E. FETTER   2,018,517

ELASTIC ADHESIVE BANDAGE

Filed April 1, 1933

Edward Fetter, Inventor

By Edwin Hammels, Attorney

Patented Oct. 22, 1935

2,018,517

UNITED STATES PATENT OFFICE 2,018,517

ELASTIC ADHESIVE BANDAGE

Edward Fetter, Baltimore, Md.

Application April 1, 1933, Serial No. 663,881

2 Claims. (Cl. 128—335)

In the treatment of wounds incident to operations and resulting from other causes, the practice of stitching to close the edges or lips of the wound is found objectionable both on account of unsightly scars due to the stitches and also to the tendency of infection resulting from the stitches. Also, there is a tendency of the flesh to gap and pucker between stitches.

The object of the present invention is to provide a bandage whereby the objectionable features incident to stitching are voided, any clean cut being closed without any scar at all and without any tendency to infection, and other wounds which are more difficult of treatment because of the actual removal of skin and flesh, are closed with less tendency to scars and infection than in accordance with the previous practice. The word clean as above used means that the edges are not very ragged and little or no flesh is removed.

In accordance with the present invention the necessity for stitching is dispensed with by the use of a stretchable elastic bandage having adhesive properties which enable it to stick closely to the skin. Ordinary raw rubber does not adhere to the skin.

In the practice of the invention, a material in the nature of a rubber compound having strong adhesive properties in connection with the skin is provided in any suitable manner as by mixing raw rubber with a resinous substance of which Canada balsam is an example. A material having antiseptic properties, preferably in the form of a concentrate may also be added. The rubber and the resinous substance with or without the antiseptic are mixed in any suitable manner as in a mill. Any suitable material to give the compound antiseptic properties may be used, oxyquinoline being an example of an available material for this purpose. A concentrate is most easily utilized, the rubber serving as a base or diluent therefor, the use of the rubber in this way being parallel to the use of water or other liquid in forming an antiseptic solution. It is found that when oxyquinoline is mixed with the raw rubber in the manner described herein, the rubber thus mixed being placed on the surface of the skin, the oxyquinoline is exuded from the body of the rubber and gradually deposited on the skin furnishing a continuous supply of antiseptic to the skin beneath the bandage.

This adhesive rubber compound preferably containing antiseptic in an available form therein, it being understood that this material is not vulcanized, is then applied as a coating to sheets of raw rubber, it being understood in this connection that raw rubber in sheets as they occur in commercial form is moldable and self adhesive and has a considerable degree of elasticity so that when stretched to a certain extent they tend to recover their original dimensions, but this raw rubber does not adhere to the skin. Treated with adhesive as described, it adheres strongly to the skin and may be used as hereinafter described to close wounds instead of stitching.

In accordance with another form of the invention, the adhesive coating described may be applied to vulcanized rubber sheets instead of to unvulcanized rubber, the vulcanized rubber sheets having a high degree of elasticity.

In the treatment of a wound one end of the bandage is caused to adhere to the flesh at one side of the wound, the lips of the wound are closed and the bandage is stretched and the other end is caused to adhere to the flesh on the other side of the wound. To prevent sticking and to give the wound suitable ventilation, also to provide for the use of healing and antiseptic compounds a piece of absorbent fabric may be used to cover the wound between the ends of the elastic bandage. This underlies the center of the bandage which holds the fabric in place.

It will be understood that when one end of an elastic sheet is caused to adhere to the flesh and tension is applied, there is a tendency to contract the rubber sheet transversely and a consequent tendency to pucker the flesh. To avoid this tendency the outside or top surfaces of the bandage at each end may be covered with fabric which is caused to adhere to the rubber in any suitable or well known manner.

In the accompanying drawing I have illustrated a bandage embodying the features of my invention in the preferred form.

Figure 1:
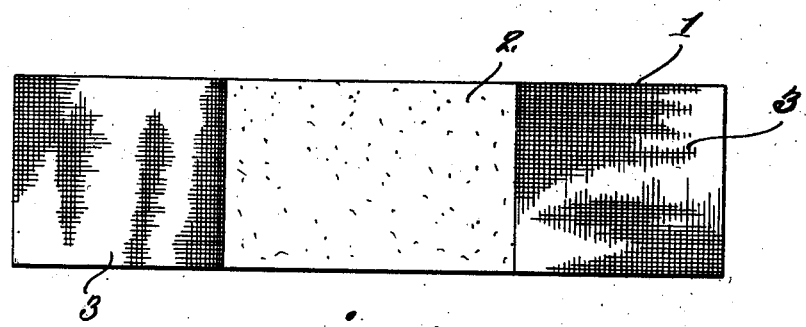
Figure 1 is a top plan view of the bandage showing the fabric.
Figure 2:
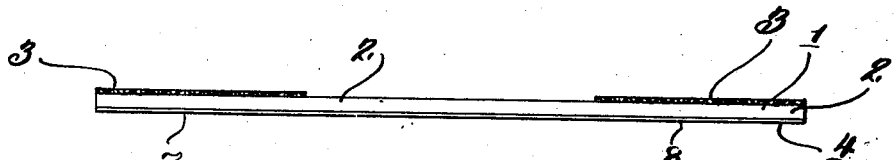
Figure 2 is an elevation of the same showing the edge of the bandage.

Referring to the drawing by numerals, the bandage I consists of a strip or sheet of raw, or, if desired, of vulcanized rubber 2. This may be reinforced at the ends with portions of fabric 3 to prevent contraction of the cross section due to the tension applied to the bandage. A coating of adhesive rubber or similar compound on the under or active surface of the bandage is indicated by reference character 4.

Figure 3:
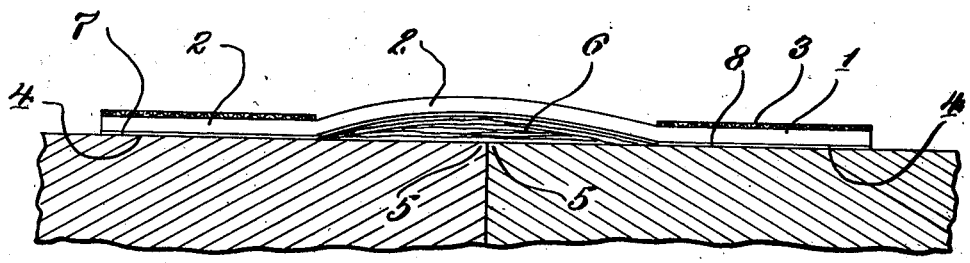
Figure 3 is a diagrammatic sectional view showing the edges of a wound closed by means of the bandage in accordance with the preferred practice.

In Figure 3 I have shown a cross section of a wound, the lips or edges of the wound being indicated by reference character 5. In bandaging the wound, it is preferably first covered by means of a piece of gauze or absorbent fabric 6. One end of the bandage at 7 is then affixed to the flesh at one side of the wound. The wound having been closed and first pressed together, the bandage is stretched across the wound and the other end at 8 is then caused to adhere to the flesh. If the wound is of considerable extent, several strips of the bandage material are applied transversely, but the effect of a complete seal of such a wound is best avoided. Slighter wounds as on the hands or other exposed parts can be sealed and protected in this way.

I have thus described specifically and in detail a bandage embodying the features of my invention in the preferred form in order that the manner of constructing, applying, operating and using the invention may be fully understood, however, the specific terms herein are used descriptively rather than in a limiting sense, the scope of the invention being defined in the claims.

What I claim as new and desire to secure by Letters Patent is:

1. An elastic bandage as a substitute for stitching for use in closing a wound, the same consisting of a sheet of stretchable elastic compound having an adhesive adapted to adhere to the human skin on one side, the ends being reinforced on the opposite side from the coating with sheet material adapted to prevent transverse contraction during stretching, the bandage being adapted to be affixed to the skin on both sides of the wound in stretched condition to close the wound by the tendency of the bandage to contract.

2. An elastic bandage as a substitute for stitching for use in closing a wound, the same consisting of a sheet of stretchable elastic compound having an adhesive surface adapted to adhere to the human skin, the ends being reinforced with sheet material adapted to prevent transverse contraction during stretching, the bandage being adapted to be affixed to the skin on both sides of the wound in stretched condition to close the wound by the tendency of the bandage to contract.

EDWARD FETTER.